US008527007B2

(12) United States Patent
Bai et al.

(10) Patent No.: US 8,527,007 B2
(45) Date of Patent: Sep. 3, 2013

(54) MULTIMEDIA MESSAGE SYSTEM AND METHOD FOR SENDING MULTIMEDIA MESSAGE

(75) Inventors: Guangchang Bai, Guangdong (CN); Dawei Li, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1322 days.

(21) Appl. No.: 11/626,017

(22) Filed: Jan. 23, 2007

(65) Prior Publication Data

US 2007/0190985 A1 Aug. 16, 2007

Related U.S. Application Data

(63) Continuation of application No. PCT/CN2005/001220, filed on Aug. 9, 2005.

(30) Foreign Application Priority Data

Aug. 16, 2004 (CN) .......................... 2004 1 0058452

(51) Int. Cl.
*H04W 40/00* (2009.01)
*H04W 4/00* (2009.01)

(52) U.S. Cl.
USPC ..... 455/560; 455/428; 455/432.1; 455/435.1; 455/445

(58) Field of Classification Search
USPC ........................................................ 455/433
See application file for complete search history.

(56) References Cited

U.S. PATENT DOCUMENTS

2001/0005675 A1 6/2001 Aho
2003/0037176 A1* 2/2003 Dannehr et al. ................ 705/39
2003/0158812 A1* 8/2003 Engelhart ....................... 705/39
2004/0039789 A1* 2/2004 Jackson et al. ................ 709/217
2004/0185847 A1 9/2004 Hamalainen et al.
2005/0078660 A1* 4/2005 Wood ............................ 370/352

FOREIGN PATENT DOCUMENTS

| CN | 1494043 A | 5/2004 |
| CN | 100372391 C | 2/2008 |
| DE | 10237131 | 2/2004 |
| FI | 113000 B | 2/2004 |
| WO | 01/33782 A1 | 5/2001 |
| WO | 03/026138 A2 | 3/2003 |
| WO | 03/030474 A2 | 4/2003 |

OTHER PUBLICATIONS

Brief English translation of Russian Office Action.
"Technical Specification Group Terminals; Multimedia Messaging Service (MMS) Functional description; Stage 2 (Release 5)"; 3GPP TS 23.140 V5.2.0, XX, XX; Mar. 1, 2002; pp. 1-120; XP00240780.
European Office Action for European Application No. 05772830.5, dated May 21, 2008.
Gwenael Le Bodic; "Multimedia Messaging Service: An Engineering Approach to MMS"; Alcatel, France; John Wiley & Sons Ltd, 2003; 17 pages.
Russian Office Action for Russian Patent Application No. 2007106020, dated Jun. 11, 2009, and English translation thereof.
English translation of the Written Opinion of the International Searching Authority for International Application No. PCT/CN2005/001220, dated Nov. 10, 2005.
European Communication for European Patent Application No. 05 772 830.5, dated Sep. 21, 2011; 6 pages.

\* cited by examiner

*Primary Examiner* — Kwasi Karikari
*Assistant Examiner* — Natasha Cosme

(57) ABSTRACT

The present invention discloses a multimedia message system, which includes: a terminal; a Multimedia Message Service Center (MMSC), which serves to receive, store and send multimedia messages; and a Multimedia Message Service Gateway (MMSG) connecting with at least one MMSC and the terminal belonging to the MMSG respectively, which serves to authenticate the terminal and a user in the multimedia message and a provided service, and to send the multimedia messages from the terminal or the MMSC. And the present invention provides three methods for sending multimedia messages. The system and methods provided by the present invention can lower the load of the MMSC and enhance the security of the MMSC.

14 Claims, 7 Drawing Sheets

MULTIMEDIA MESSAGE SYSTEM AND METHOD FOR SENDING MULTIMEDIA MESSAGE

CROSS-REFERENCE TO RELATED APPLICATIONS

This application is a continuation of International Application No. PCT/CN2005/001220 filed on Aug. 9, 2005. This application claims the benefit of Chinese Patent Application No. 200410058452.1 filed on Aug. 16, 2004. The disclosures of the above applications are incorporated herein by reference.

FIELD

The present disclosure relates to the Multimedia Message Service (MMS), and more particularly, to a multimedia message system and a method for sending multimedia messages.

BACKGROUND

The statements in this section merely provide background information related to the present disclosure and may not constitute prior art.

As a mobile data service, the MMS can support many high-speed data services such as voice, internet browsing, E-mail, and conference TV, and can achieve instant delivery of multimedia information between mobile terminals and between mobile phone terminals and Internet. The multimedia messages are delivered by multimedia message systems. With a rapid growth of data service users and a booming development of the MMS, the MMS has been recognized as a new profitable business. Therefore, the MMS should be supported by a more secure, more effective and more complete mobile data service architecture.

FIG. 1 is a schematic diagram illustrating the architecture of the multimedia message system in the prior art, which includes: MMS terminals, an MMS Center (MMSC), a Wireless Application Protocol Gateway (WAPGW), a Value Added Service Provider (VASP) and a Gateway-Service Control Point (G-SCP). The MMSC serves to receive, store and send multimedia messages; the WAPGW serves to connect the MMSC with a mobile network, to carry the multimedia message service between the MMSC and the MMS terminals, and the MMSC and MMS terminals can communicate with each other only via the mobile network; the VASP, also called a Service Provider (SP), which is connected with the MMSC via an Internet Protocol (IP) network, serves to provide value added services; and the G-SCP serves to bill the prepaid users.

When an MMS terminal sends a multimedia message to an SP, the MMS terminal sends an edited multimedia message to a home MMSC of the MMS terminal via the WAPGW and the mobile network or only via the mobile network. The home MMSC of the MMS terminal receives and stores the multimedia message sent by the MMS terminal, and sends the received multimedia message to the SP.

When the SP sends a multimedia message to the MMS terminal, the SP sends the multimedia message to the MMSC to which it is connected. Upon receiving the multimedia message, the MMSC determines which MMSC is the home MMSC of the receiving MMS terminal. If the MMSC to which the SP is connected and the home MMSC of the receiving MMS terminal are the same one, the MMSC stores the multimedia message or sends the multimedia message to the receiving MMS terminal via the WAPGW and the mobile network or only via the mobile network; if the MMSC to which the SP is connected and the home MMSC of the receiving MMS terminal are different, the MMSC to which the SP is connected sends the received multimedia message to the home MMSC of the receiving MMS terminal; the home MMSC of the receiving MMS terminal stores the multimedia message or sends the message to the receiving MMS terminal via the WAPGW and the mobile network or only via the mobile network upon receiving the multimedia message.

Based on the system illustrated in FIG. 1, a flowchart of the method for sending a multimedia message in the prior art is shown in FIG. 2 and FIG. 3. FIG. 2 is a flowchart illustrating the method for the SP sending a multimedia message to the MMS terminal in the prior art. And FIG. 3 is a flowchart illustrating the method for the MMS terminal sending a multimedia message to the SP in the prior art.

As shown in FIG. 2, the method for the SP sending a multimedia message to the MMS terminal in the prior art includes the following steps:

Step 201: the SP sends an MM7_submit.REQ message to the MMSC. The message carries a multimedia message, which further carries address information, such as the mobile phone number of the receiving MMS terminal;

Step 202: upon receiving the MM7_submit.REQ message, the MMSC authenticates the SP to verify whether the service provided by the SP is a subscribed service, and authenticates the receiving user in the SP service request to check the user's subscription relationship and the validity of the user's status, and determines which MMSC is the home MMSC of the receiving user. If the MMSC to which the SP is connected and the home MMSC of the receiving MMS terminal are different, it is necessary for the MMSC to which the SP is connected to send the multimedia message to the home MMSC of the receiving MMS terminal.

Step 203: after the authentication is completed, the MMSC returns an MM7_submit.RES response message to the SP, which carries the information about whether the multimedia message is successfully submitted. If the multimedia message is successfully submitted, proceed to Step 204; and otherwise, terminate the flow.

Steps 204~205: the MMSC sends a billing request to the G-SCP. Upon receiving the billing request, the G-SCP returns a billing request response.

Steps 206~207: the home MMSC of the receiving MMS terminal sends an MM1_notification.REQ message to the receiving MMS terminal, notifying the receiving MMS terminal to retrieve the multimedia message from the MMSC. Upon receiving the MM1_notification.REQ message, the receiving MMS terminal sends an MM1_notification.RES message to the MMSC, signifying that it has received the notification.

Steps 208~210: the MMS terminal sends an MM1_retrieve.REQ message to the MMSC requesting the MMSC to retrieve the multimedia message. Upon receiving the MM1_retrieve.REQ message, the MMSC returns an MM1_retrieve.RES message carrying the multimedia message to the receiving MMS terminal. Upon receiving the multimedia message, the MMS terminal returns an MM1_Acknowledgement.REQ response message to the MMSC.

Steps 211~212: Upon receiving the MM1_Acknowledgement.REQ response message, the MMSC sends a billing confirmation to the G-SCP. Upon receiving the billing confirmation, the G-SCP returns a billing confirmation response.

As shown in FIG. 3, the method for the MMS terminal sending a multimedia message to the SP in the prior art includes the following steps:

Step 301: the MMS terminal sends a message MM1_submit.REQ carrying the multimedia message to the MMSC.

Steps 302~303: upon receiving the MM1_submit.REQ message from the MMS terminal, the MMSC checks the contents of the multimedia message and authenticates the MMS terminal, the SP and the service. After the content checking and the authentication, the MMSC returns an MM1_submit.RES response message to the MMS terminal. If the multimedia message is successfully submitted, proceed to Step 304. Otherwise, terminate the flow.

Steps 304~305: the MMSC sends a billing request to the G-SCP. Upon receiving the billing request, the G-SCP returns a billing request response to the MMSC.

Steps 306~307: the MMSC sends an MM7_delivery.REQ message to the SP, which carries the multimedia message. Upon receiving the MM7_delivery.REQ message, the SP returns an MM7_delivery.RES response message.

Steps 308~309: upon receiving the MM7_delivery.RES response message, the MMSC sends a billing confirmation to the G-SCP. Upon receiving the billing confirmation, the G-SCP returns a billing confirmation response.

SUMMARY

A multimedia message system is provided to achieve a separation between access and transmission of services so as to protect the core transmitting equipment.

Three methods for sending multimedia messages are also provided to achieve a separation between the access and the transmission of services so as to alleviate the work load of the MMSC.

A multimedia message system, includes:

a terminal;

a Multimedia Message Service Center (MMSC), which serves to receive, store and send multimedia messages; and a Multimedia Message Service Gateway (MMSG) connecting with at least one MMSC and the terminal belonging to the MMSG respectively, which serves to authenticate the terminal and a user in the multimedia message and a provided service, and to send the multimedia messages from the terminal or the MMSC.

A method for sending multimedia messages, includes:

configuring a Multimedia Message Service Gateway (MMSG) in a multimedia message system, and connecting the MMSG respectively with a Multimedia Message Service Center (MMSC) and a first terminal, the MMSG is the home MMSG of the first terminal;

the first terminal submits a service request carrying a multimedia message to the home MMSG;

upon receiving the service request, the home MMSG of the first terminal authenticates the access of the first terminal, a service and a user in the service request and sends the multimedia message in the service request to the home MMSC of the receiving user.

A method for sending multimedia messages, includes:

configuring a Multimedia Message Service Gateway (MMSG) in a multimedia message system, and connecting the MMSG respectively with a Multimedia Message Service Center (MMSC) and a first terminal, wherein the MMSG is the home MMSG of the first terminal;

a second terminal submits a service request carrying the multimedia message to the MMSC;

the MMSC finds the home MMSG of the first terminal according to the ID of the first terminal contained in the received service request, and sends the service request to the home MMSG; and the home MMSG authenticates the first terminal, a service and the user terminal in the service request, and sends the multimedia message to the first terminal.

A method for sending multimedia messages, includes:

upon receiving a service request, a Multimedia Message Service Gateway (MMSG) authenticates the access of a terminal which sends the service request, a service and the user in the service request, and sends the multimedia message in the service request.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
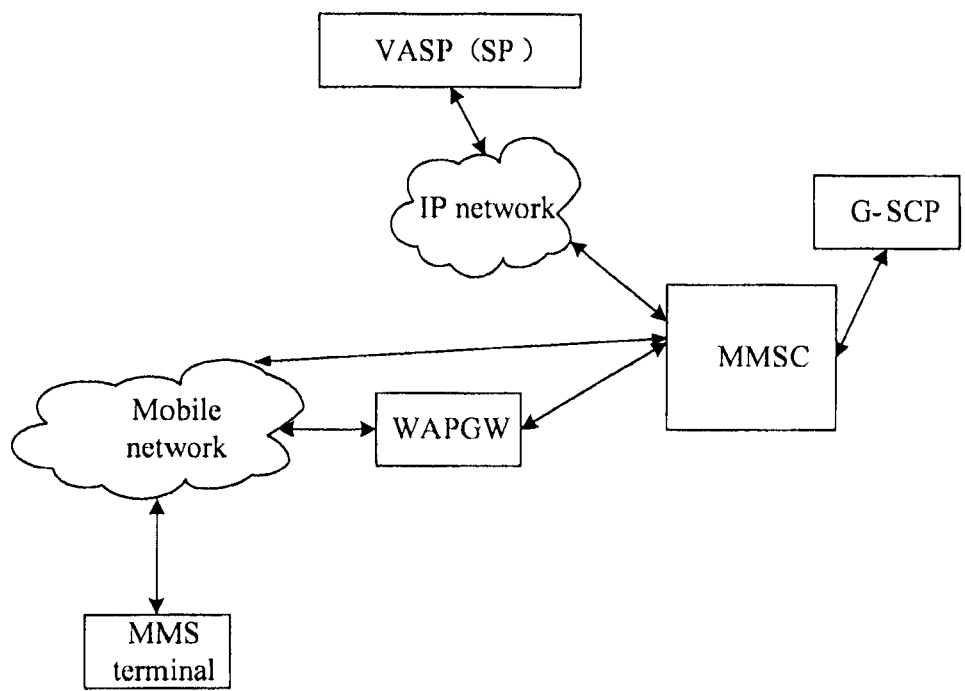
FIG. 1 is a schematic diagram illustrating the architecture of a multimedia message system in the prior art.
Figure 2:
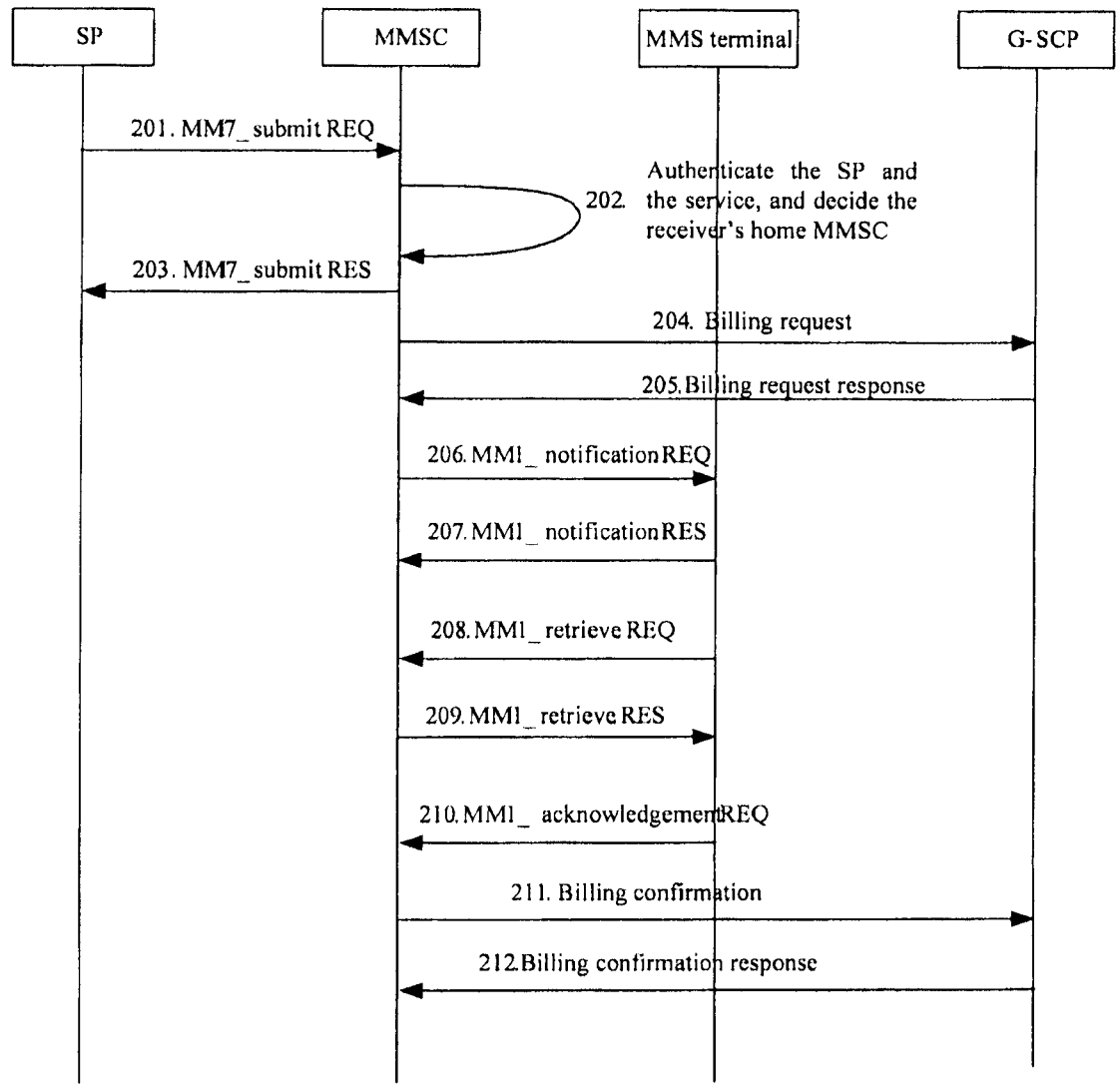
FIG. 2 is a flowchart illustrating a method for the SP sending a multimedia message to the MMS terminal in the prior art.
Figure 3:
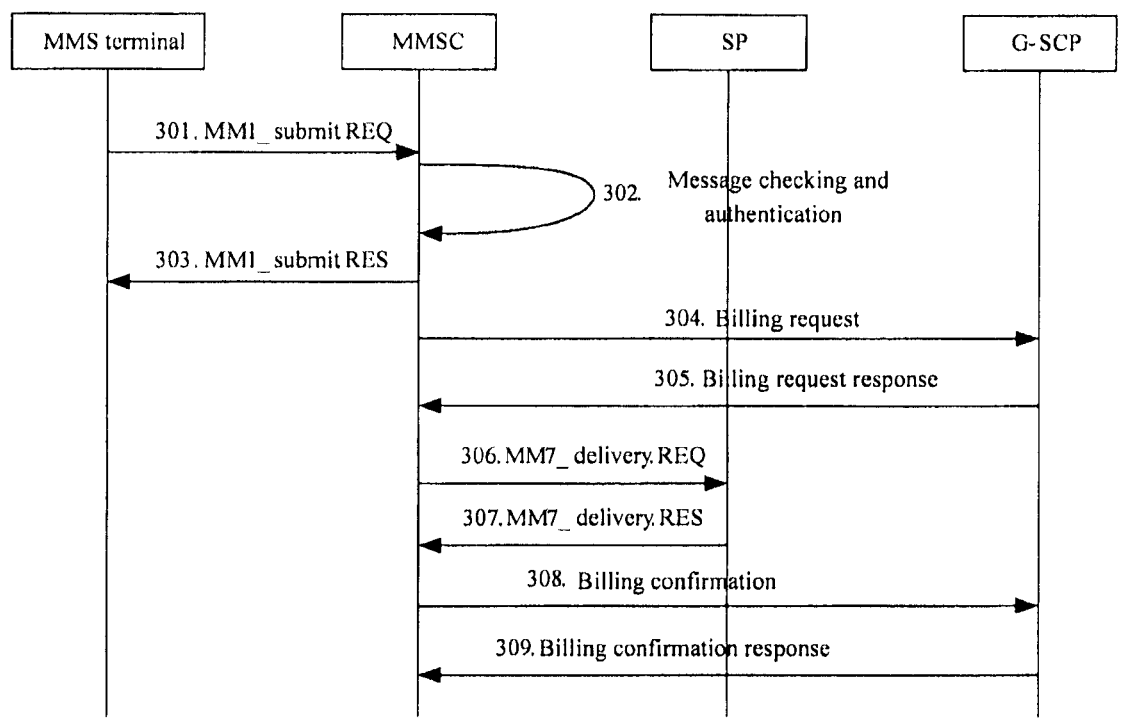
FIG. 3 is a flowchart illustrating a method for the MMS terminal sending a multimedia message to the SP in the prior art.

The following description is merely exemplary in nature and is not intended to limit the present disclosure, application, or uses. It should be understood that throughout the drawings, corresponding reference numerals indicate like or corresponding parts and features.

Figure 4:
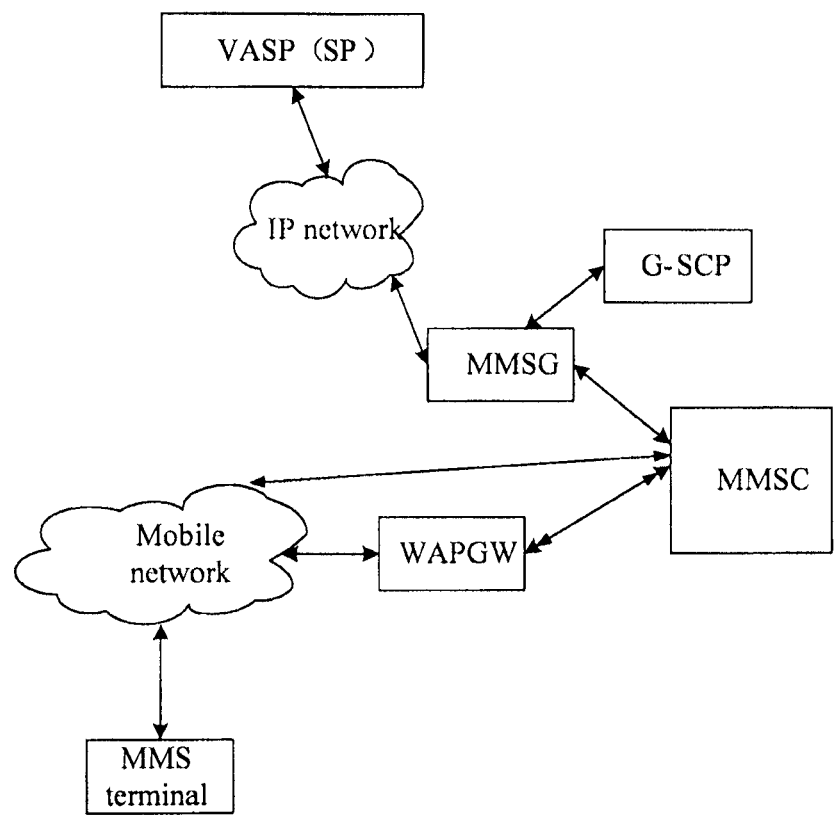
FIG. 4 is a schematic diagram illustrating an architecture of a multimedia message system including an MMSG according to an embodiment of the present invention.

FIG. 4 is a schematic diagram illustrating the architecture of a multimedia message system including the MMSG according to an embodiment of the present invention. The multimedia message system includes an MMS terminal, an MMSC, a WAPGW, an SP, a G-SCP and an MMSG. The MMSG sends multimedia messages from the SP or the MMSC, and authenticates the accessed SP and the services provided by the SP. The SP has subscribed to the MMSG. The SP is connected to its home MMSG via the IP network, and the MMSG is connected with the MMSC. The MMSG is also connected with the G-SCP providing a charging interface for the prepaid user.

When the MMS terminal sends a multimedia message to the SP, the MMS terminal first sends the edited multimedia message to the home MMSC of the MMS terminal via the WAPGW. The MMSC receives and stores the multimedia message submitted by the MMS terminal, and sends the received multimedia message to the home MMSG of the SP. The MMSG authenticates the SP, the SP service and the MMS terminal. If the authentication is successful, the MMSG sends the received multimedia message to the SP.

When the SP sends a multimedia message to the MMS terminal, the SP first sends the multimedia message to its home MMSG. The MMSG authenticates the SP, the SP service and the MMS terminal. If the authentication is successful, the MMSG sends the received multimedia message to the home MMSC of the receiving MMS terminal according to the receiving user's number. Upon receiving the multimedia message, the home MMSC of the MMS terminal stores or sends the multimedia message to the receiving MMS terminal via the WAPGW.

In an alternative embodiment, the MMSG and the MMSC may store a list of all the ID numbers of SPs that belongs to the MMSG to signify the home relationship between the SP and the MMSG. The home relationship between the user terminal and the MMSC can be signified by a mapping list that stores the relationship between the user ID and the MMSC, wherein, the mapping list is stored in the MMSG and the MMSC. The ID number of the SP may be the access number of the SP, and the user ID may be a mobile phone number.

The MMSG in the multimedia message system is connected with only one MMSC according to an embodiment of the present invention. However, the MMSG according to another embodiment of the present invention may be connected with a plurality of MMSCs instead of only one MMSC. In such a case, the MMSG needs to possess routing functions or needs to be connected with an ENUM DNS SERVER that maps the telephone number to a domain name of the MMSC. When the MMSC to which the home MMSG of the SP is connected and the home MMSC of the receiving MMS terminal are different, the MMSG can obtain the address of the receiving MMS terminal's home MMSC from its routing table information or from the ENUM DNS SERVER according to the receiving user's number, then sends the multimedia message to the found MMSC directly.

Figure 5:
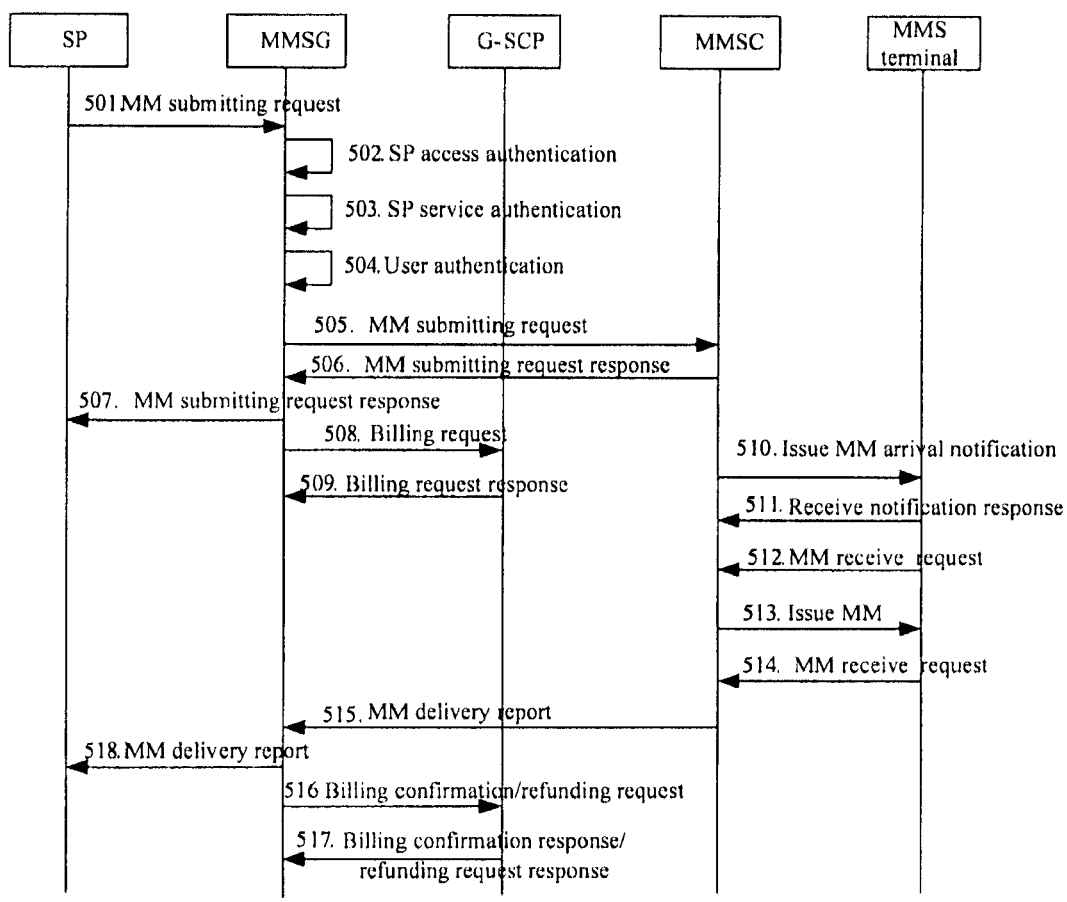
FIG. 5 is a flowchart illustrating a method for the SP sending a multimedia message to the MMS terminal of the same home MMSC according to an embodiment of the present invention.

Based on the multimedia message system illustrated in FIG. 4, in case that the MMSC to which the home MMSG of the SP is connected and the home MMSC of the receiving MMS terminal are the same, the method for the SP sending a multimedia message to the receiving MMS terminal in an embodiment of the present invention is as shown in FIG. 5, which includes:

Step 501: the SP sends an MM submitting request that carries the multimedia message to be delivered to its home MMSG.

Step 502: the MMSG performs an access authentication to the SP, wherein the access authentication includes authenticating the subscription relationship, the access account and password, and also the IP address of the SP to access. If the access authentication is successful, proceed to Step 503; otherwise, the MMSG returns error information to the SP, and terminates the flow.

Step 503: the MMSG performs a service authentication to the service according to the service request of the SP, wherein the service authentication includes checking the validity of the service in the service request, for instance, whether the service is subscribed, and whether the service is in an available status. If the service authentication is successful, proceed to Step 504; otherwise, the MMSG returns error information to the SP, and terminates the flow.

Step 504: the MMSG authenticates the user in the service request of the SP, including checking the subscription relationship between the user and the SP, and checking the validity of the user's status; if the service should be subscribed, the MMSG needs to authenticate the service subscription relationship of the user who is requesting the service. If the authentication is successful, proceed to Step 505; otherwise, the MMSG returns error information to the SP, and terminates the flow.

The executive sequence of Step 503 and Step 504 is not fixed. That is, Step 504 may be executed before Step 503.

Steps 505~507: the MMSG sends the MM submitting request to the MMSC it has accessed. The MMSC authenticates the accessed MMSG after it has received the MM submitting request, and returns an MM submitting request response to the MMSG. The MMSG sends the MM submitting request response to the SP after it has received the MM submitting request response returned by the MMSC.

If the receiving user is a prepaid subscriber, Steps 508~509 are executed; upon receiving the MM submitting request response of a successful MM submission returned by the MMSC, the MMSG sends a billing request to the G-SCP, and the G-SCP returns a billing request response after it has received the billing request.

If the receiving user is a postpaid subscriber, Steps 508~509 are not executed.

Steps 510~514: the MMSC sends an MM arrival notification to the receiving MMS terminal. The receiving MMS terminal returns a response after it has received the MM arrival notification. The receiving MMS terminal sends an MM receive request to the MMSC. Upon receiving the MM receive request from the receiving MMS terminal, the MMSC issues an MM to the receiving MMS terminal. The receiving MMS terminal returns an MM response message to the MMSC after it has received the MM. It should be noted that, the Steps 510-514 mentioned above are a description of an example of the MMS terminal delayed retrieving of the multimedia message.

Step 515: the MMSC receives the MM response returned by the MMS terminal, and sends to the MMSG an MM delivery status report carrying the information whether the MM is sent successfully.

Step 516~517: in the case of a prepaid user, if the MM delivery status report indicates that the MM is delivered successfully, the MMSG sends a billing confirmation to the G-SCP; otherwise, the MMSG sends a refunding request to the G-SCP. Then the G-SCP returns a billing confirmation response or a refunding request response. In the case of a postpaid user, when the MMSG receives the MMS delivery status report carrying the information of a successful MM delivery, the MMSG triggers a billing function, i.e., the MMSG generates a Calling Detail Record (CDR) and sends it to the billing system directly or the billing system obtains the CDR for billing operation.

Figure 6:
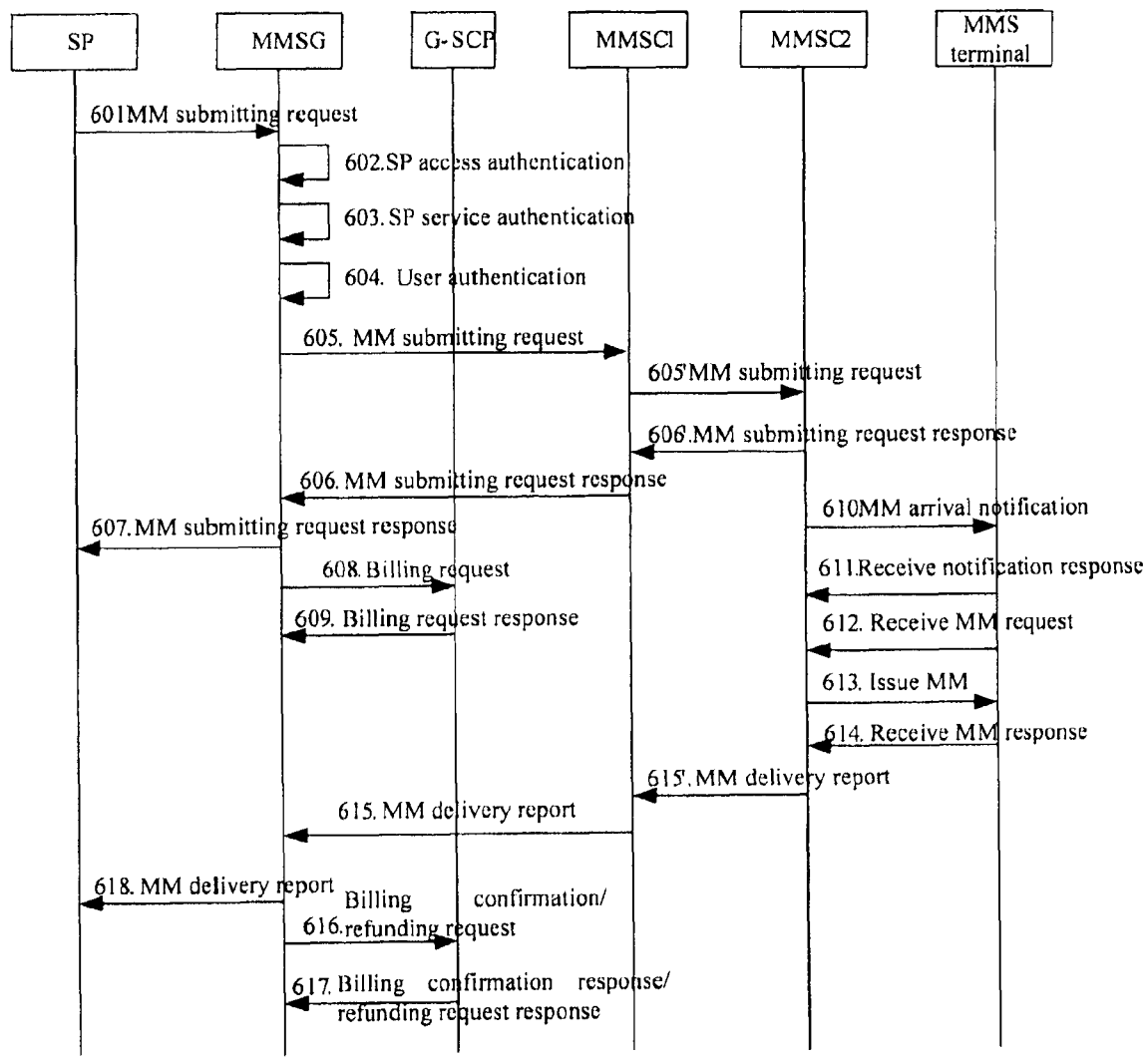
FIG. 6 is a flowchart illustrating a method for the SP sending a multimedia message to the MMS terminal of a different home MMSC according to an embodiment of the present invention.

Step 518: if the SP demands the MM delivery status report in the MM submitting request, the MMSG also sends the MM delivery status report to the SP. When the MMSC to which the home MMSG of the SP is connected and the home MMSC of the receiving MMS terminal are different, the method for the SP sending a multimedia message to the receiving MMS terminal according to an embodiment of the present invention is shown in FIG. 6, wherein, the home MMSG of the SP is connected with MMSC1, and MMSC2 is the home MMSC of the receiving MMS terminal. In such a case, besides Steps 601~617 that are identical to Steps 501~517 illustrated in FIG. 5, the method according to the present embodiment also includes the following steps after Step 605:

Steps 605'~606': upon determining the home MMSC of the receiving MMS terminal is the MMSC2 according to the receiving user's number, the MMSC1 sends the MM submitting request carrying the multimedia message to the MMSC2. The MMSC2 returns an MM submitting request response to the MMSC1 after it has received the MM submitting request. Then proceed to Step 606.

Correspondingly, the method further includes the steps hereunder after Step 614:

Step 615': upon receiving the MM response returned by the MMS terminal, the MMSC2 sends to the MMSC1 the MM delivery status report. Then proceed to Step 615.

Additionally, it is conceivable that, in the present embodiment, the MMS message submitted to the MMSC by the SP via the MMSG may be sent to external application servers, for instance, an E-mail server, in the case hereof, the MMS message's delivery address is the E-mail box. The external application servers are connected with the MMSC via the IP network, which is presented in neither FIG. 1 nor FIG. 4.

Figure 7:
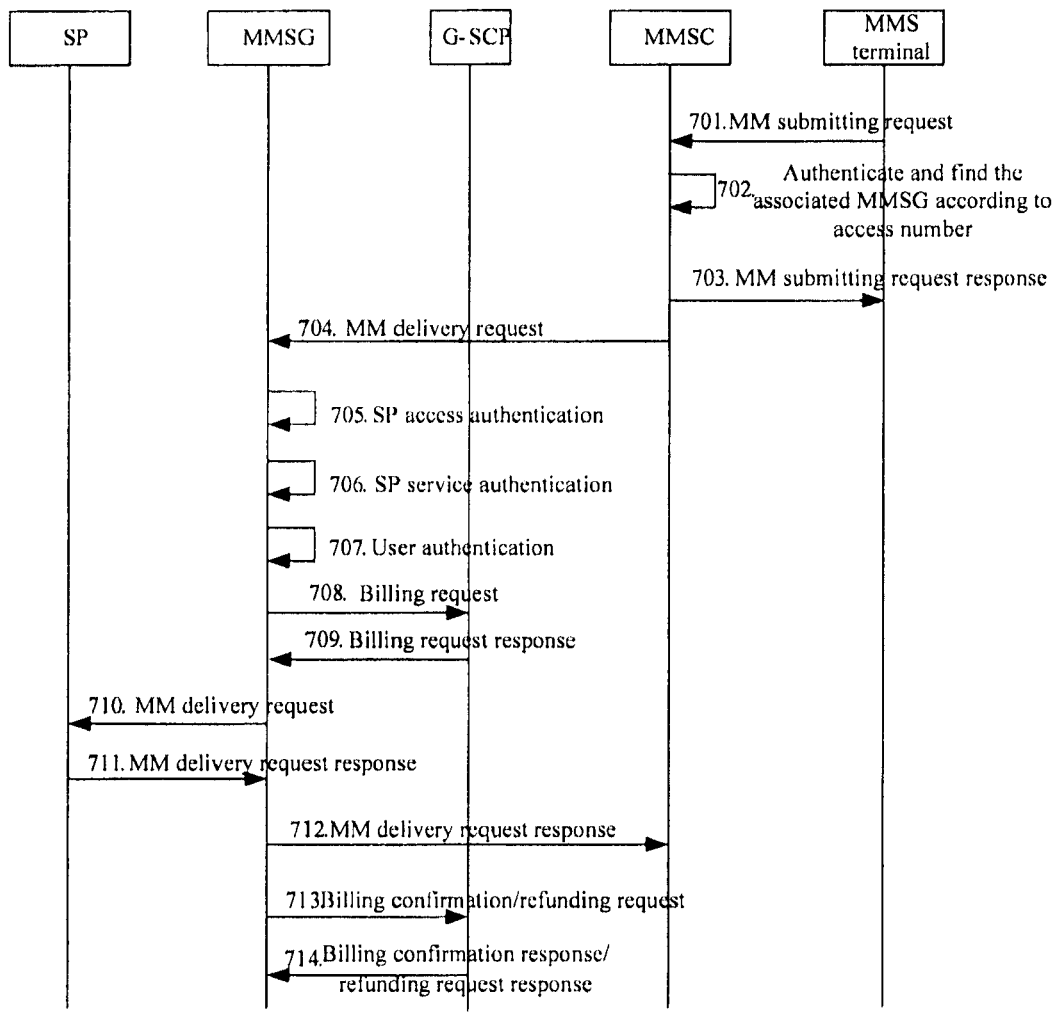
FIG. 7 is a flowchart illustrating a method for the MMS terminal sending a multimedia message to the SP according to an embodiment of the present invention.

FIG. 7 is a flowchart illustrating a method for the MMS terminal sending a multimedia message to the SP according to an embodiment of the present invention, wherein, the MMSC to which the home MMSG of the SP is connected and the home MMSC of the receiving MMS terminal are the same, and the method includes:

Step 701: the MMS terminal sends an MM submitting request that carries the multimedia message to be delivered to its home MMSC.

Steps 702-703: the MMSC authenticates the MMS terminal, and finds the home MMSG of the SP according to the access number of the SP in the multimedia message. Then the MMSC returns an MM submitting request response to the MMS terminal.

Step 704: the MMSC sends an MM delivery request that carries the multimedia message to be delivered to the home MMSG of the SP.

Steps 705~707: upon receiving the MM delivery request from the MMSC, the MMSG authenticates the SP and the service in the MM delivery request, and authenticates the user in the service delivery request, e.g., to check the user's subscription relationship and the validity of the user's status; if the authentication is successful, proceed to step 708; otherwise, terminate the flow. Wherein, the sequence of Steps 705~707 is changeable.

Steps 708~709: the MMSG sends a billing request response after it has received the billing request. If the sending user is a postpaid subscriber, Steps 708~709 are not executed.

Step 710: the MMSG sends an MM delivery request to the SP according to the access number of the SP, with the multimedia message to be delivered carried in the request.

Step 711~712: upon receiving the MM delivery request that carries the multimedia message from the MMSG, the SP returns an MM delivery request response to the MMSG. Upon receiving the MM delivery request response returned by the SP, the MMSG sends the MM delivery request response to the MMSC.

Steps 713~714: if the MM is delivered successfully, in the case of a prepaid user, the MMSG sends a billing confirmation to the G-SCP; otherwise, the MMSG sends a refunding request to the G-SCP. Then the G-SCP returns a billing confirmation response or a refunding request response. In the case of a postpaid user, the MMSG triggers the billing function, i.e., the MMSG generates a CDR and sends it to the billing system directly or the billing system obtains the CDR for billing operation.

Wherein, the billing principles that a user terminal sends an MM to the SP are similar to those of that the SP delivers an MM to a user terminal. In the case of a prepaid user, the MMSG sends to the G-SCP a billing request, while in the case of a postpaid user, the MMSG triggers the billing function.

When the MMSC to which the home MMSG of the SP is connected and the home MMSC of the user terminal are different, besides the Steps 701~711 mentioned above, the method for the sending user terminal sending a multimedia message to the SP further includes sending a message between the two MMSCs.

From the solution mentioned above we can see that, connection of the SP and the MMSC via the MMSG and unitary access and authentication of the SP by the MMSG achieves a separation between the access and the transmission of the services, lowers the load of the MMSC, protects the core transmitting equipment, and enhances the security of the MMSC. What's more, the MMSG is able to control the local access and local management of the SP to facilitate development of local services.

The foregoing description is only preferred embodiments of the present invention and is not used for limiting the protection scope thereof. All the modifications, equivalent replacements or improvements in the scope of the present invention's sprit and principles shall be included in the protection scope of the present invention.

What is claimed is:

1. A multimedia message system, comprising:
    a Service Provider (SP);
    a Multimedia Message Service Center (MMSC), which serves to receive, store and send multimedia messages; and
    a Multimedia Message Service Gateway (MMSG) connecting with at least one MMSC and the SP belonging to the MMSG respectively, the MMSG serving to authenticate the SP and a user of the multimedia message as well as a service provided by the SP, the MMSG further serving to authenticate whether the user has subscribed to the provided service and to send the multimedia messages from the SP or the MMSC;
    if the user is a prepaid user, the MMSG that has received the multimedia message serving to send a billing request; and
    if the user is a postpaid user, the MMSG that has received a message carrying a success sending information serving to trigger a billing function to generate a Calling Detail Record (CDR).

2. The system according to claim 1, further comprising:
    a Gateway-Service Control Point (G-SCP) connecting with the MMSG and billing prepaid users.

3. A method for sending multimedia messages, comprising:
    configuring a Multimedia Message Service Gateway (MMSG) in a multimedia message system, and connecting the MMSG respectively with a Multimedia Message Service Center (MMSC) and a Service Provider (SP), wherein the MMSG is a home MMSG of the SP;
    the SP submitting a service request carrying a multimedia message to the home MMSG;
    upon receiving the service request, the home MMSG of the SP authenticating the access of the SP, a service and a user in the service request, as to the service in the service request needing to be subscribed, the home MMSG of the SP authenticating service subscription relationship of the user in the service request, and sending the multimedia message in the service request to a home MMSC of the receiving user;

in the case of a prepaid user,
the home MMSG of the SP that has received the service request sending a billing request; and in the case of a postpaid user,
the home MMSG of the SP that has received a message carrying a success sending information triggering a billing function to generate a Calling Detail Record (CDR).

4. The method according to claim 3, wherein, the step of sending the multimedia message to the home MMSC of the receiving user comprises:

in case that the MMSG is connected with one MMSC,
the MMSG sending the multimedia message directly to the MMSC which it connects with, and
deciding whether the receiving user is a subscriber of the MMSC connected with the MMSG according to the receiving user's ID; and
if the receiving user is not a subscriber of the MMSC connected with the MMSG, the MMSC searching for the home MMSC of the receiving user, and sending the received multimedia message to the found home MMSC of the receiving user;
in case that the MMSG is connected with a plurality of MMSCs,
the MMSG searching for the home MMSC of the receiving user according to the receiving user's ID, and sending the received multimedia message to the found home MMSC of the receiving user.

5. A method for sending multimedia messages, comprising:

configuring a Multimedia Message Service Gateway (MMSG) in a multimedia message system, and connecting the MMSG respectively with at least one Multimedia Message Service Center (MMSC) and a Service Provider (SP), wherein the MMSG is a home MMSG of the SP;
a user terminal submitting a service request carrying the multimedia message to the MMSC;
the MMSC finding the home MMSG of the SP according to the SP ID in the received service request, and sending the service request to the home MMSG; and
the home MMSG authenticating the SP, a service and a user in the service request, as to the service in the service request needing to be subscribed, the home MMSG authenticating service subscription relationship of the user in the service request, and sending the multimedia message to the SP;
in the case of a prepaid user,
the home MMSG that has received the multimedia message sending a billing request;
in the case of a postpaid user,
the home MMSG that has received a message carrying a successful sending information triggering a billing function to generate a Calling Detail Record (CDR).

6. A multimedia message system for transferring a multimedia message between a Service Provider (SP) and a Multimedia Message Service Center (MMSC), comprising:

the MMSC, which serves to receive, store, and send the multimedia message, and to store a home relationship between the SP and the MMSG, the MMSC being configured to determine the home MMSG of the SP to which the received multimedia message is sent according to the home relationship, and send the multimedia message to the home MMSG of the SP; and the MMSG with a routing function that connects at least one MMSC and the SP belonging to the MMSG respectively, the MMSG being configured to perform an access authentication to the SP, perform a service authentication to a service provided by the SP for checking the validity of the service, and authenticate a user of the multimedia message for checking the subscription relationship between the user and the SP, and to send the multimedia messages from the SP to the MMSC or from the MMSC to the SP.

7. The system according to claim 6, further comprising:
an ENUM Domain Name Server (ENUM DNS SERVER) connected with the MMSG, which maps a telephone number to a domain name of the MMSC and serves to provide the MMSG with address information of the home MMSC of the user receiving the multimedia message.

8. The system according to claim 6, further comprising:
a Gateway-Service Control Point (G-SCP) connecting with the MMSG and billing prepaid users.

9. At a home Multimedia Message Service Gateway (MMSG) of a Service Provider (SP) in a communication network, a method for sending a multimedia message between a Service Provider (SP) and a Multimedia Message Service Center (MMSC), comprising:

receiving, by a Multimedia Message Service Gateway (MMSG), a service request carrying a multimedia message from the SP, wherein the MMSG is a home MMSG of the SP in a multimedia message system and connects respectively with the MMSC and the SP;
upon receiving the service request, performing, by the MMSG, an access authentication to the SP, performing a service authentication to a service provided by the SP for checking the validity of the service, and authenticating a user in the service request for checking the subscription relationship between the user and the SP, and
upon authentication, sending, by the MMSG, the multimedia message in the service request to a home MMSC of the receiving user.

10. The method according to claim 9, further comprising:
carrying out, by the MMSC, access authentication of the accessed MMSG upon receiving the multimedia message from the MMSG, and notifying the receiving user to retrieve the multimedia message;
receiving, by the MMSC, a response returned from the receiving user after the terminal of the receiving user retrieves the multimedia message from the home MMSC; and
sending, by the MMSC, to the MMSG a multimedia message delivery status report upon receiving the response.

11. The method according to claim 9, wherein, the step of sending the multimedia message to the home MMSC of the receiving user comprises:

determining if the MMSG is connected with one MMSC, wherein if the MMSG is connected with one MMSC, the method further includes:
sending, by the MMSG, the multimedia message to the connected MMSC, and
deciding, by the MMSC, whether the receiving user belongs to the MMSC connected with the MMSG according to the receiving user's ID; and
if the receiving user does not belong to the MMSC connected with the MMSG, searching, by the MMSC, for the home MMSC of the receiving user, and sending the received multimedia message to the found home MMSC of the receiving user;

if the MMSG is connected with a plurality of MMSCs, the method further includes:

searching, by the MMSG, for the home MMSC of the receiving user according to the receiving user's ID, and sending the received multimedia message to the found home MMSC of the receiving user.

12. The method according to claim 10, further comprising:

determining if the user is a prepaid user or postpaid user, wherein if the receiving user is a prepaid user, the method further includes:

sending, by the MMSG, a billing request to a Gateway-Service Control Point (G-SCP) after the MMSG has submitted the multimedia message to the MMSC connected with the MMSG:

receiving a multimedia message delivery status report; and sending, by the MMSG, a billing confirmation or a refunding request to the G-SCP according to the received multimedia message delivery status report sent from the MMSC;

otherwise, if the receiving user is a postpaid user, the method further includes receiving the multimedia message delivery status report carrying a success sending information;

generating, by the MMSG, a Calling Detail Record (CDR), and sending the CDR to a billing system.

13. At a home Multimedia Message Service Gateway (MMSG) of a Service Provider (SP) in a communication network, a method for sending a multimedia, message between a Service Provider (SP) and a Multimedia Message Service Center (MMSC), comprising:

receiving, by the MMSC, a service request carrying the multimedia message from a user terminal;

finding, by the MMSC, a Multimedia Message Service Gateway (MMSG) of the SP according to the SP identifier in the received service request and a home relationship between the SP and the MMSG stored on the MMSC, and sending the service request to the home MMSG of the SP; wherein the MMSG is configured as a home MMSG of the SP in a multimedia message system, and connects respectively with the MMSC and the SP; and upon receiving the service request, performing, by the MMSG, an authentication to the SP, performing a service authentication to a service provided by the SP, and authenticating a user in the service request for checking the subscription relationship between the user and the SP, and upon authentication, sending, by the MMSG, the multimedia message to the SP.

14. The method, according to claim 13, further comprising:

determining if the user is a prepaid user or postpaid user, wherein if the receiving user is a prepaid user, the method further includes:

sending, by the MMSG, a billing request to a Gateway-Service Control Point (G-SCP) after the MMSG has received the multimedia message;

receiving a multimedia message submitting response sent from the SP, and sending, by the MMSG, a billing confirmation or a refunding request to the G-SCP;

otherwise, if the receiving user is a postpaid user, the method further includes sending the multimedia message to the SP;

generating, by the MMSG, a Calling Detail Record (CDR), and sending the CDR to a billing system.

* * * * *